United States Patent
Onggosanusi et al.

(10) Patent No.: US 7,295,624 B2
(45) Date of Patent: Nov. 13, 2007

(54) WIRELESS SYSTEM WITH HYBRID AUTOMATIC RETRANSMISSION REQUEST IN INTERFERENCE-LIMITED COMMUNICATIONS

(75) Inventors: Eko N. Onggosanusi, Dallas, TX (US); Anand G Dabak, Plano, TX (US); Timothy M. Schmidl, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 629 days.

(21) Appl. No.: 10/260,761

(22) Filed: Sep. 30, 2002

(65) Prior Publication Data
US 2004/0203456 A1    Oct. 14, 2004

Related U.S. Application Data

(60) Provisional application No. 60/362,123, filed on Mar. 6, 2002.

(51) Int. Cl.
*H04B 7/02* (2006.01)

(52) U.S. Cl. ............... 375/267; 342/378; 370/913; 375/143; 375/152; 375/299; 375/343; 375/347; 455/101; 708/314

(58) Field of Classification Search ............... 370/228, 370/278, 334, 337, 330, 342, 280, 298, 303; 714/748; 455/101, 67.11
See application file for complete search history.

(56) References Cited

U.S. PATENT DOCUMENTS

| | | | |
|---|---|---|---|
| 5,729,541 A | * | 3/1998 | Hamalainen et al. ....... 370/337 |
| 6,101,168 A | * | 8/2000 | Chen et al. ................. 370/228 |
| 6,144,711 A | * | 11/2000 | Raleigh et al. ............. 375/347 |

OTHER PUBLICATIONS

Shahid Qureshi, Adaptive Equalization, Sep. 1985, Proceedings of the IEEE, vol. 73, pp. 1349-1387.*
Samardzija et al; Performance Evaluation of the VBLAST algorithm in W-CDMA systems; VTC 2001; vol. 2, Oct. 7-11, 2001 pp. 723-727.*

* cited by examiner

*Primary Examiner*—David C. Payne
*Assistant Examiner*—Adolf DSouza
(74) *Attorney, Agent, or Firm*—Ronald O. Neerings; Wade J. Brady, III; Frederick J. Telecky, Jr.

(57) ABSTRACT

A wireless receiver for receiving signals from an interference-limited transmitter in an interference-limited system comprising at least one transmit antenna, wherein the signals comprise a plurality of symbols. The receiver comprises a plurality of receive antennas and collection circuitry for collecting a plurality of signal samples with at least one symbol and interference effects. The receiver also comprises suppression circuitry, accumulation circuitry, circuitry for providing estimates of a group of bits, error detection circuitry and circuitry for requesting the transmitter to transmit a retransmission of a packet in response to detecting an error.

32 Claims, 4 Drawing Sheets

WIRELESS SYSTEM WITH HYBRID AUTOMATIC RETRANSMISSION REQUEST IN INTERFERENCE-LIMITED COMMUNICATIONS

CROSS-REFERENCES TO RELATED APPLICATIONS

This application claims the benefit, under 35 U.S.C. §119(e)(1), of U.S. Provisional Application No. 60/362,123 (TI-34194PS), filed Mar. 6, 2002, and incorporated herein by this reference.

STATEMENT REGARDING FEDERALLY SPONSORED RESEARCH OR DEVELOPMENT

Not Applicable.

BACKGROUND OF THE INVENTION

The present embodiments relate to wireless communications systems and, more particularly, to interference-limited wireless communication systems with packet retransmission in response to detected packet error.

Wireless communications are prevalent in business, personal, and other applications, and as a result the technology for such communications continues to advance in various areas. One such advancement includes the use of spread spectrum communications, including that of code division multiple access ("CDMA") and wideband code division multiple access ("WCDMA") cellular communications. In such communications, a user station (e.g., a hand held cellular phone) communicates with a base station, where typically the base station corresponds to a "cell." CDMA communications are by way of transmitting symbols from a transmitter to a receiver, and the symbols are modulated using a spreading code which consists of a series of binary pulses. The code runs at a higher rate than the symbol rate and determines the actual transmission bandwidth. Another wireless standard involves time division multiple access ("TDMA") apparatus, which also communicate symbols and are used by way of example in cellular systems. TDMA communications are transmitted as a group of packets in a time period, where the time period is divided into slots (i.e., packets) so that multiple receivers may each access meaningful information during a different part of that time period. In other words, in a group of TDMA receivers, each receiver is designated a slot in the time period, and that slot repeats for each group of successive packets transmitted to the receiver. Accordingly, each receiver is able to identify the information intended for it by synchronizing to the group of packets and then deciphering the time slot corresponding to the given receiver. Given the preceding, CDMA transmissions are receiver-distinguished in response to codes, while TDMA transmissions are receiver-distinguished in response to orthogonal time slots.

In certain prior art packet communication systems as detailed later, packet retransmission is often requested when a received packet is detected to be in error. This scheme is often referred to as automatic retransmission request ("ARQ"), and ARQ is intended to reduce or eliminate the effects of packet error, as is often desirable in systems where packet reliability is of high importance such as in multimedia applications. Typically, ARQ is achieved by including some type of error check in each transmitted packet, such as a cyclic redundancy code ("CRC") at the end of a packet and that relates to the data in the packet. When the packet is received, the receiver decodes the packet and, hence, also the CRC code, further determining from the code whether the packet was received without errors. The receiver also has a wireless feedback communication link to the transmitter, and in connection with ARQ there is often an acknowledgment feedback signal along this link such as in the form of one of two complementary signals designated ACK and NACK. If, from the CRC (or alternate code/method), the receiver detects no errors in a given packet, then the receiver returns an ACK signal to the transmitter, whereas if the receiver does detect an error in a given packet, then the receiver returns a NACK signal to the transmitter. In response to the NACK, the transmitter retransmits the packet corresponding to the NACK, that is, that packet for which an error was detected. This retransmission may take place several times for a same packet, where typically there is a limit on the number of retransmissions, after which the packet is deemed unusable by receiver and as a result the packet is discarded.

Another technology that relates in part to ARQ, and that is also used in certain prior art packet communication systems as detailed later, is referred to as hybrid ARQ ("HARQ"), where HARQ differs from ARQ in that HARQ recognizes that error-containing packets may still provide some useful data at the receiver. In other words, recall from above that the receiver discards the entire packet under ARQ if, after repeated retransmissions, an error free packet is not received. In contrast, HARQ systems attempt to extract some or all of the data from packets that have been deemed to include errors. There are various types of HARQ systems known in the art. One example of a HARQ system is known as Chase combining. In a Chase combining system, the receiver performs some coherent combining on multiple received packets that are received as re-transmissions of an originally-transmitted packet. Another example of a HARQ system is known as an incremental redundancy system. In an incremental redundancy system, the data bits in each retransmitted packet are the same; however, different encoding bits are used for each different retransmission. Further, the receiver is made aware of the different encoding schemes and, thus, it attempts to decode each different packet it receives representing a retransmission in view of the encoding bits anticipated to be applied to that packet. The results of each such decode are then combined in an effort to accurately predict the packet data.

Having introduced ARQ and HARQ systems, note that the above introduction also states that such systems are used in certain prior art packet communication systems; in this regard, the present inventors have observed that those systems as studied in the literature have been confined to additive white Gaussian noise ("AWGN") or typical fading channels. Such systems typically provide a transmitter with a single transmit antenna and a receiver with a single receive antenna and, thus, the channel between them may be static wherein noise is the primary variance, or in the case of the fading channel there may be additional diversity due to the fading characteristics. Thus, heretofore, HARQ has only been implemented in these types of systems.

More recently there have been developments into wireless communications systems that provide additional types of signal diversity and that are often more practical, but these same systems are interference-limited. In other words, due to the transmitter and/or receiver structure, multiple symbols share the same channel between the transmitter and receiver and, hence, interference is introduced between different symbols communicated from the transmitter to the receiver. As a result, the receiver requires functionality to suppress the interference. Such systems are included in many forms. As one example of an interference-limited system, there are high data rate multiple antenna systems such as multiple-input multiple-output ("MIMO") systems. In MIMO systems, each transmit antenna transmits a distinct and respective data stream; the symbols in each stream therefore interfere with the symbols in the other stream(s), that is, there is spatial interference since different transmit antennas are used to transmit different data streams. As another example of an interference-limited system, there is the above-introduced TDMA systems. In TDMA systems, there are frequency selective channels with long impulse responses; this causes so-called intersymbol interference ("ISI"), and typically equalizers are used to mitigate the ISI. As yet another example of an interference-limited system, there is the above-introduced CDMA systems. In CDMA, one type of multipath interference effect is multiuser interference ("MUI"). Moreover, since CDMA implements orthogonal symbol streams, often the orthogonality reduces ISI to a negligible value and, as a result, often a less complex receiver structure may be implemented in a CDMA system. However, there is often required a lowering of the spreading factor, that is, the number of modulating chips per transmitted symbol; this spreading factor reduction also reduces the benefit of orthogonality and consequently increases the concern for ISI even in CDMA systems. Still other examples of interference-limited systems can be ascertained by one skilled in the art, including any combination such as MIMO TDMA or MIMO CDMA.

Given the preceding, the present inventors further recognize that while HARQ systems have heretofore been described relative to systems without interference, no provision has been made for implementing HARQ into an interference-limited system. In view of the preceding, therefore, the preferred embodiments address the drawback of the limited application of prior art HARQ systems to systems that are not interference limited; further, such prior art systems, while permitting HARQ and thereby obtaining the benefit of increased packet reliability, suffer from a lack of speed or throughput as compared to interference-limited systems. As such, the present embodiments endeavor to provide various preferred embodiments representing a combination of HARQ (or a comparable methodology) with interference-limited systems, as detailed below.

BRIEF SUMMARY OF THE INVENTION

In the preferred embodiment, there is a wireless receiver for receiving signals from a transmitter in an interference-limited system comprising at least one transmit antenna, wherein the signals comprise a plurality of symbols. The receiver comprises at least one receive antenna and collection circuitry. The collection circuitry is coupled to the at least one receive antenna and is for collecting a plurality of signal samples from the at least one receive antenna. The plurality of signal samples comprise at least one symbol and interference effects between different symbols communicated from the transmitter to the receiver. The receiver also comprises suppression circuitry, coupled to the collection circuitry, for suppressing the interference effects. The receiver also comprises circuitry for receiving signals from the suppression circuitry and for providing estimates of a group of bits and detection circuitry for detecting an error in a packet that comprises the group of bits. Lastly, the receiver also comprises circuitry for requesting the transmitter to transmit a retransmission of a packet in response to the detection circuitry detecting the error.

Other circuits, systems, and methods are also disclosed and claimed.

DETAILED DESCRIPTION OF THE INVENTION

The preferred embodiments provide wireless transmissions of symbols from an interference-limited transmitter to a receiver, where the receiver implements hybrid automatic retransmission request ("HARQ") functionality. More particularly, therefore, when the receiver receives a packet of symbols that is found to be in error, the receiver requests retransmission of the symbol packet; thereafter, the receiver accumulates those retransmissions as well as operating to suppress the interference in the received signals. As discussed above in the Background Of The Invention section of this document, interference-limited systems may take many forms. Thus, by way of example the following illustrates a general interference-limited system with it understood that the inventive aspects provided below may be employed in other interference-limited systems.

Figure 1:
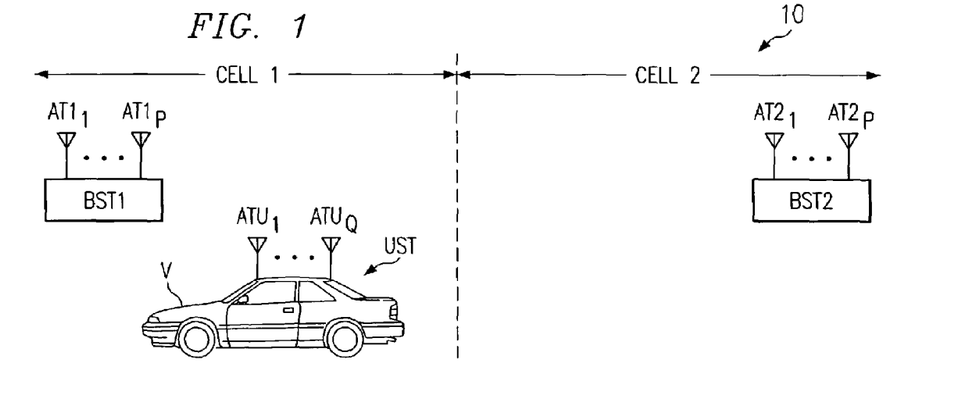
FIG. 1 illustrates a diagram of a cellular communications system 10 that is interference limited, and that by way of example could be a CDMA or TDMA system, in which the preferred embodiments may operate.

FIG. 1 illustrates a diagram of a cellular communications system 10 that is interference limited, and that by way of example could be a MIMO, CDMA or TDMA system, in which the preferred embodiments may operate. Within system 10 are shown two base stations BST1 and BST2. Each base station BST1 and BST2 includes a respective set of P transmit antennas $AT1_1$ through $AT1_P$ and $AT2_1$ through $AT2_p$ through which each station may transmit or receive wireless signals. The general area of intended reach of each base station defines a corresponding cell; thus, base station BST1 is intended to generally communicate with cellular devices within Cell 1, while base station BST2 is intended to generally communicate with cellular devices within Cell 2. Of course, some overlap between the communication reach of Cells 1 and 2 exists by design to support continuous communications should a communication station move from one cell to the other. Indeed, further in this regard, system 10 also includes a user station UST, which is shown in connection with a vehicle V to demonstrate that user station UST typically is mobile. User station UST includes a multiple number Q of antennas $ATU_1$ through $ATU_Q$ for both transmitting and receiving cellular communications. Lastly, one skilled in the art should appreciate that insofar as system 10 and the preferred embodiments apply to various CDMA systems, they also apply to WCDMA systems which are a type of CDMA system.

In some respects, system 10 may operate according to known general techniques for various types of cellular or other spread spectrum communications, including TDMA and CDMA communications. Such general techniques are known in the art and include the commencement of a call from user station UST and the handling of that call by either or both of base stations BST1 and BST2. Where system 10 differs from the prior art, however, is the system for, and method of, performing retransmission of symbols by a transmitter in system 10 and receiving and accumulating those retransmissions and also suppressing the interference in those signals. These distinctions are further detailed below in connection with FIGS. 2 through 4.

Figure 2A:
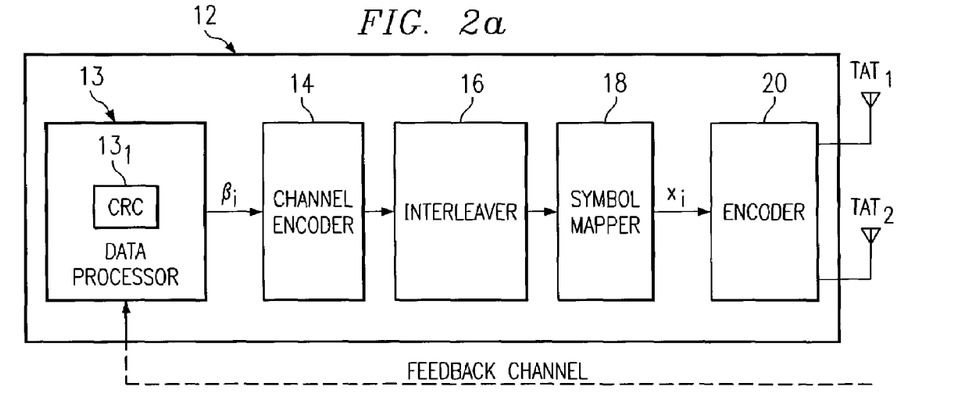
FIG. 2a illustrates an electrical and functional block diagram of a first transmitter 12 according to the preferred embodiment and which may be used for either or both of base stations BST1 and BST2 in FIG. 1.

FIG. 2a illustrates an electrical and functional block diagram of a first transmitter 12 according to the preferred embodiment and which may be used for either or both of base stations BST1 and BST2 in FIG. 1. In various respects, transmitter 12 may be constructed according to principles known in the art for interference-limited systems, but as further detailed below such known aspects are improved as a whole due to the inclusion within transmitter 12 of the functionality to retransmit symbols, as a group in the form of a packet, as part of a HARQ operation performed by a corresponding receiver. In general and as detailed below, transmitter 12 operates to transmit multiple encoded signals to a receiver such as in user station UST of FIG. 1. By ways of example, the multiple encoded signals could include space-time transmit diversity ("STTD") or orthogonal transmit diversity ("OTD") signals, and they may be in either a CDMA or TDMA format Turning more specifically to transmitter 12, from a data processor 13 it receives information bits $B_i$ at an input to a channel encoder 14. Data processor 13 is intended to represent that bits $B_i$ may be provided from various types of sources. Additionally, and as further detailed below, data processor 13 includes a cyclic redundancy code ("CRC") block $13_1$ that also adds, typically by appending, a CRC set of bits to groups of bits within data processor 13. These bits, or a comparable technique as may be ascertained by one skilled in the art, are used by a receiver that receives signals from transmitter 12 to detect errors in the received data. Indeed, if such errors are found, then such a receiver communicates, via a feedback channel as shown in FIG. 2a along a dotted line, to an input to data processor 13 so that re-transmission of certain bits may be accomplished in response to the receiver receiving a packet of bits and determining from the CRC or the like that the received packet includes erroneous data. Channel encoder 14 encodes the information bits $B_i$ in an effort to improve raw bit error rate. Various encoding techniques may be used by channel encoder 14 and as applied to bits $B_i$, with examples including the use of convolutional code, block code, turbo code, or a combination of any of these codes.

The encoded output of channel encoder 14 is coupled to the input of an interleaver 16. Interleaver 16 operates with respect to a block of encoded bits and shuffles the ordering of those bits so that the combination of this operation with the encoding by channel encoder 14 exploits the time diversity of the information. For example, one shuffling technique that may be performed by interleaver 16 is to receive bits in a matrix fashion such that bits are received into a matrix in a row-by-row fashion, and then those bits are output from the matrix to a symbol mapper 18 in a column-by-column fashion.

Symbol mapper 18 converts its input bits to symbols, designated generally as $x_j$. The converted symbols $x_j$ may take various forms, such as quadrature phase shift keying ("QPSK") symbols, binary phase shift keying ("BPSK") symbols, or quadrature amplitude modulation ("QAM") symbols. In any event, symbols $x_j$ may represent various information such as user data symbols, as well as pilot symbols and control symbols such as transmit power control ("TPC") symbols and rate information ("RI") symbols.

Each symbol $x_j$ is coupled to a symbol encoder 20, where as introduced above encoder 20 could be by ways of example an STTD encoder or an OTD encoder. Further while not shown, multiple encoders also may used. Indeed, additional details regarding such alternatives may be found in U.S. patent application Ser. No. 10/107,275 filed Mar. 26, 2002, entitled "Space Time Encoded Wireless Communication System With Multipath Resolution Receivers," and hereby incorporated herein by reference. Encoder 20 operates as known in the art and, of course depends on the type of encoding implemented (e.g., STTD, OTD), but in the illustrated example provides a pair of signal outputs. Further, while not shown, in a CDMA implementation, the paired outputs of encoder 20 will be spread by a spreading code and then connected to transmit antennas $TAT_1$ and $TAT_2$, whereas for a TDMA implementation the paired outputs of encoder 20 are connected directly to transmit antennas $TAT_1$ and $TAT_2$. In any event, from the preceding and for sake of later reference the output of encoder 20, at a given time (n), may be expressed as a vector s(n), as shown in the following Equation 1:

$$s(n) = \begin{bmatrix} s_1(n) \\ s_2(n) \end{bmatrix} \qquad \text{Equation 1}$$

Further, the symbol vector over a period of time such as encompassing an entire symbol or multiple symbols may be referred to more generally as s. As an additional observation before proceeding, for sake of a preferred embodiment and also as an illustrative example, transmitter 12 includes a total of two transmit antennas $TAT_1$ and $TAT_2$. However, one skilled in the art should recognize that many of the inventive teachings of this document may be applied to transmitters with a number of antennas greater than two. Additionally, while OTD and STTD systems imply multiple transmit antennas, note also the either CDMA or TDMA may be implemented using only a single transmit antenna and, thus, the preferred embodiments further include such single-transmit antennas in their scope.

Figure 2B:
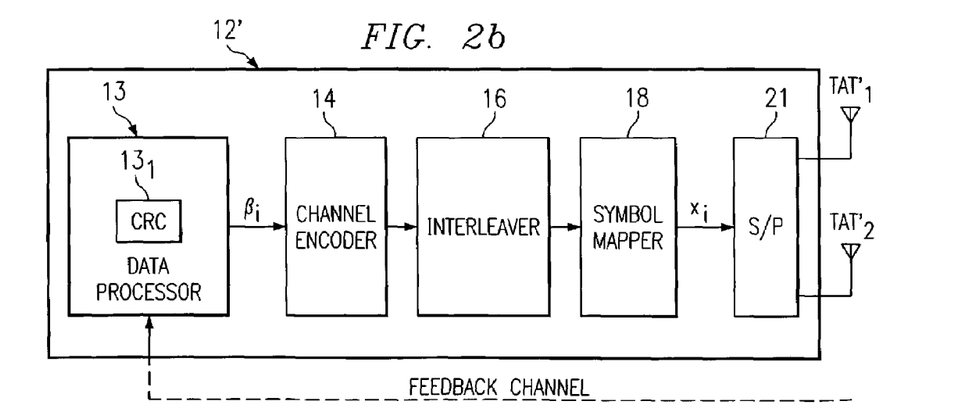
FIG. 2b illustrates an electrical and functional block diagram of a second transmitter 12' according to the preferred embodiment and which may be used for either or both of base stations BST1 and BST2 in FIG. 1.

FIG. 2b illustrates an electrical and functional block diagram of a second transmitter 12' according to the preferred embodiment and which in many respects resembles transmitter 12 of FIG. 2a, where like reference numbers are carried forward from FIG. 2a to FIG. 2b to indicate like features. Further, therefore, transmitter 12' also may be used for either or both of base stations BST1 and BST2 in FIG. 1, where transmitter 12' also provides an interference-limited system that is improved as a whole due to the inclusion within transmitter 12' of the functionality to retransmit symbols, as a group in the form of a packet, as part of a HARQ operation performed by a corresponding receiver.

Transmitter 12' differs from transmitter 12 in that transmitter 12' is generally a multiple-input multiple-output ("MIMO") system, meaning transmitter 12' has at least two or more transmit antennas for transmitting to a receiver, where there is no redundancy between symbols transmitted by different ones of the transmit antennas. Looking more specifically in this regard to FIG. 2b, again the output of symbol mapper 18 provides a stream of symbols $x_i$. However, these symbols are connected as an input to a serial-to-parallel converter 21. Serial-to-parallel converter 21, therefore, outputs parallel streams of symbols to each of its transmit antennas. In the example of FIG. 2b, two such transmit antennas $TAT_1'$ and $TAT_2'$ are shown and, thus, serial-to-parallel converter 21 outputs two such streams. For example, for a stream of symbols $x_1$, $x_2$, $x_3$, $x_4$ input to serial-to-parallel converter 21, it outputs symbols $x_1$ and $x_3$ to transmit antenna $TAT_1'$ and it outputs symbols $x_2$ and $x_4$ to transmit antenna $TAT_2'$. Thus, one skilled in the art will appreciate that there is no symbol redundancy as between the symbol stream on transmit antenna $TAT_1'$ and the symbol stream on transmit antenna $TAT_2'$. In addition, however, symbols transmitted along one transmit antenna may interfere with symbols transmitted along the other transmit antenna and, thus, transmitter 12' is part of an interference-limited system.

Figure 3:
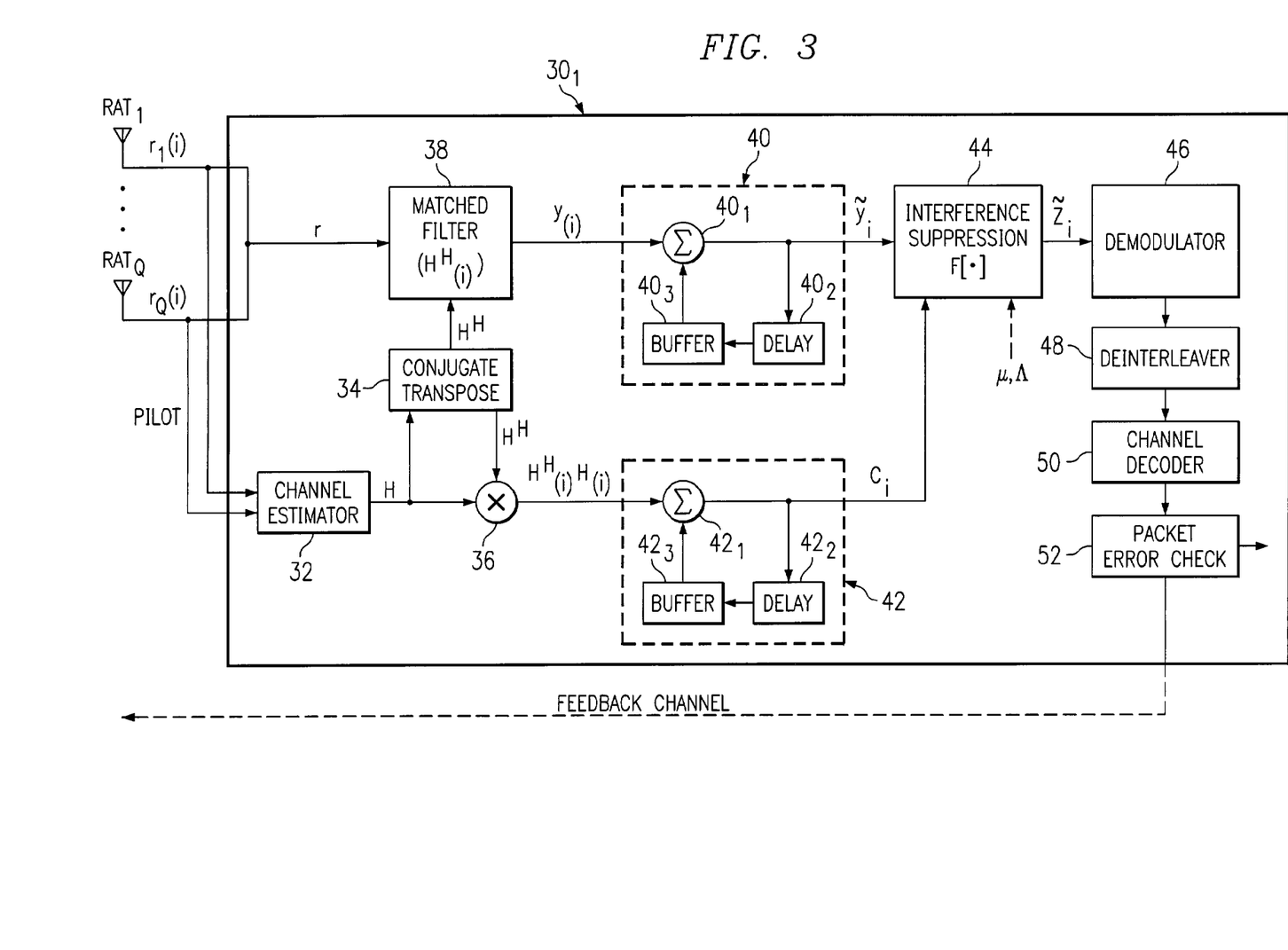
FIG. 3 illustrates an electrical and functional block diagram of a receiver $30_1$ according to the preferred embodiment and for receiving signals from either of transmitter 12 of FIG. 2a or transmitter 12' of FIG. 2b.

FIG. 3 illustrates an electrical and functional block diagram of a receiver $30_1$ according to the preferred embodiment and for receiving signals from transmitter 12 of FIG. 2a or transmitter 12' of FIG. 2b. Receiver $30_1$ includes a total of Q receive antennas $RAT_1$ through $RAT_Q$, where the actual value of Q may be one or greater, such as discussed in the above-incorporated U.S. patent application Ser. No. 10/107, 275 (docket: TI-32842) and also based on the type of transmitter (e.g., STTD, OTD, MIMO, and so forth). Note that each receive antenna $RAT_x$ receives a signal from each of the P transmit antennas $TAT_1$ through $TAT_P$. For the sake of convention, let each of the received signals be indicated as $r_q$ for each $q^{th}$ of the Q receive antennas and, thus, for a number Q of symbol samples received at a time (n), then a vector r of the received signals across all Q receive antennas may be defined as in the following Equation 2:

$$r(n) = \begin{bmatrix} r_1(n) \\ \vdots \\ r_Q(n) \end{bmatrix} \qquad \text{Equation 2}$$

While not shown, receiver $30_1$ preferably includes an appropriate radio frequency interface coupled to each receive antenna. Further, with respect to the received vector r, receiver $30_1$ also includes sufficient sampling circuitry to sample the received input signals across an appropriate amount of time or space based upon the type of transmitter format. Thus, the received signal vector over a period of time such as encompassing an entire symbol or multiple symbols may be referred to more generally as r. For example, if transmitter 12 or 12' provides a CDMA signal, then receiver $30_1$ correspondingly includes sufficient circuitry directed to CDMA signals, including sample collection circuitry for collecting a sufficient number of chip (or sub-chip) samples corresponding to the desired number of received symbols and also to properly remove the spreading code (i.e., to despread) from the symbols at some point in the receiver processing structure. As another example, if transmitter 12 or 12' provides a TDMA signal, then receiver $30_1$ correspondingly includes sufficient circuitry directed to TDMA signals, including sample collection circuitry for collecting a time slot (or sub-slot) samples corresponding to the desired number of received symbols. As still another example, if transmitter 12 or 12' provides a MIMO signal, then the extent of sampling symbol may depend on whether the transmitter is a spread spectrum transmitter and, hence, akin to CDMA in which case chip or sub-chip sampling is likely to be implemented or whether the transmitter is akin to TDMA in which case slot or sub-slot sampling is to be expected. In any event, the preferred embodiments contemplate accommodating any of these examples, where the remaining signal processing and functionality is necessarily adapted to the corresponding number of processed samples.

Each receive antenna $RAT_1$ through $RAT_Q$ also provides pilot symbols to a channel estimator 32. These pilot symbols are typically communicated in a separate channel such as the known common pilot channel ("CPICH"), or alternatively, pilot symbols could be included in the same channel as the data symbols. In either approach, in response to the pilot symbols, channel estimator 32 estimates, from the received pilot symbols, a channel effect estimate matrix designated herein as H. More specifically, as the signals are transmitted by transmitter 12 or 12' to receiver $30_1$, those signals are influenced by the so-called channel effect between transmitter 12 or 12' to receiver $30_1$. Accordingly, in an effort to remove this influence from the received signals, that channel effect is estimated in the form of the matrix H. To further appreciate H, note that the vector r may be written in the following Equation 3 form, where Equation 3 is further written in terms of the transmitted symbol vector s:

$$r = Hs + w \qquad \text{Equation 3}$$

From Equation 3, one skilled in the art will appreciate that r is a function of the channel matrix H, the transmitted symbols s, and a noise vector w.

Equation 3 may be written more precisely now as directed to the preferred embodiments. Specifically, by way of introduction and per the preferred embodiment, receiver $30_1$ serves to accumulate signals corresponding to an original transmission and retransmissions from transmitter 12 or 12'. In other words, in the preferred embodiment, receiver $30_1$ is operable to perform a type of ARQ operation, where in response to detecting an error such as a CRC error, receiver $30_1$ sends a wireless feedback signal to transmitter 12 or 12' which prompts transmitter 12 or 12' to retransmit the symbol packet that was deemed to be in error when received. Upon receipt of one or more retransmissions, receiver $30_1$ accumulates each of the received signals corresponding to those retransmissions. Thus, the accumulation of each retransmission later provides the basis to provide symbol detection based on multiple retransmissions, thereby providing a HARQ or HARQ-like functionality in an interference-limited system. Looking then at Equation 3, and for sake of a reference for each re-transmission, let the subscript "(i)" indicate that a corresponding signal or vector is for the $i^{th}$ retransmission of a same data from transmitter 12 or 12'; thus, Equation 3 may be written in the following form of Equation 3.1:

$$r_{(i)} = H_{(i)}s + w_{(i)} \qquad \text{Equation 3.1}$$

In Equation 3.1, $H_{(i)}$ is the QxP channel matrix experienced by the data at the $i^{th}$ transmission, and s is the same symbol vector either transmitted once originally or as the same vector for each of the I retransmissions. In all events, from the known values of the pilot symbols, channel estimator 32 determines the difference between those known values and the values corresponding to those pilot symbols as received in the vector r, from which the channel matrix H is estimated. This estimate H is connected from channel estimator 32 as an input to a conjugate transpose determination block 34 and as a multiplicand input to multiplier 36, as further discussed below.

Conjugate transpose determination block 34 performs as its name suggests, that is, using known matrix principles it determines the conjugate transpose of its matrix input; in the present instance, therefore, it determines the conjugate transpose of the channel estimate matrix H. For the sake or reference in this document, such a conjugate transpose is hereafter designated as $H^H$. The value of $H^H$ is output from conjugate transpose determination block 34 as a multiplicand input to multiplier 36 and also to a matched filter 38. Multiplier 36 determines the product of its two multiplicand inputs and, thus, it outputs the value of $H^H H$. This product is provided as an input to a channel product matrix accumulator 42, as detailed later.

Looking to matched filter 38, in addition to receiving $H^H$ from conjugate transpose determination block 34, matched filter 38 also receives the vector r from receive antennas $RAT_1$ through $RAT_Q$. Thus, matched filter 38 includes collection circuitry for collecting a number of signal samples for a number of successive time instances and from each of the plurality of receive antennas so as to represent r, as pertaining to either an original transmission, or later as to each of any of the I retransmissions. In response to its input, matched filter 38 performs a function known in the art to multiply its two inputs, a first representing the received signals and a second that, when multiplied the first, provides an output that effectively increases or maximizes the signal-to-noise ratio in the output signal; in the present case, the second factor is the conjugate transpose of the channel estimate matrix H, herein shown as $H^H$, and the multiplication of the first and second factors thereby produce an output vector y as shown in the following Equation 4:

$$y = H^H r \qquad \text{Equation 4}$$

Note also that the term matched filter is not intended to be limiting, as other names such as rake combining or maximal ratio combining also are sometimes used in the art to include the same functionality of maximizing the signal to noise ratio in the received input signal by equivalently processing that signal in view of a factor that relates to the channel effect. Lastly, the output of matched filter 38 is connected as an input to a retransmission accumulator 40.

Recalling from the previous introduction that receiver $30_1$ preferably is operable to perform a type of HARQ functionality, in more detail it will now be presented how upon receipt of one or more retransmissions, retransmission accumulator 40 accumulates each of the received signals corresponding to those retransmissions, as those signals are also processed through matched filter 38. Thus, the accumulation of each retransmission later provides the basis to provide symbol detection based on multiple retransmissions, thereby providing a HARQ or HARQ-like functionality in an interference-limited system. Looking then in greater detail at retransmission accumulator 40, the vector signal y from matched filter 38 is connected as an input to an adder $40_1$, and again the subscript "(i)" indicates that the vector $y_{(i)}$ is for the $i^{th}$ retransmission of a same data from transmitter 12 or 12'; thus, each of the first transmission, and any later I retransmissions of the same data, sent in response to a detected error by receiver $30_1$ and a corresponding request for retransmission, shall be one of a total of I+1 total transmissions of the same packet of data. The output of adder $40_1$ passes through a delay block $40_2$ to a buffer $40_3$. Note that delay block $40_2$ is included to suggest that there is anticipated some delay in the operation of accumulator 40 as it awaits receipt of subsequent retransmissions from transmitter 12 or 12'. In any event, the output of buffer $40_3$ is connected as an addend input to adder $40_1$. Looking then at the general operation of accumulator 40, note that for the first of the I+1 transmissions (i.e., the original or first transmission), it passes through delay block $40_2$ and is stored in buffer $40_3$. For a first retransmission of (i)=1, then that first retransmission is processed through matched filter 38; accordingly, the output of matched filter 38 may be stated according to the following Equation 5:

$$y_{(i)} = H^H_{(i)} r_{(i)} \qquad \text{Equation 5}$$

This output, $y_{(i)}$, is then summed by adder $40_1$ with the value of y corresponding to the first transmission and that was previously stored in buffer $40_3$. That sum again incurs a delay $40_2$ and is stored in buffer $40_3$, thereby overwriting the previous sum stored therein. From the preceding, one skilled in the art will appreciate that this process may repeat for numerous retransmissions, whereby ultimately the final I+1 transmission is added by adder $40_1$ to the accumulation corresponding to the previous I transmissions, thereby presenting a resulting output indicated herein and in FIG. 3 as $\tilde{y}_I$, and the value of $\tilde{y}_I$ is connected to an interference suppression block 44.

Interference suppression block 44, in addition to receiving $\tilde{y}_I$ from retransmission accumulator 40, also receives an accumulated channel product matrix $C_I$ from channel product matrix accumulator 42. Looking in more detail to channel product matrix accumulator 42, note that it includes blocks comparable to retransmission accumulator 40, but accumulator 42 is directed to the channel estimate that corresponds to each retransmission. Specifically, recall that multiplier 36 provides the value $H^H H$ to channel product matrix accumulator 42. This value is connected as an addend to an adder $42_1$, and for sake of consistency and given that channel product matrix accumulator 42 accumulates in a comparable manner as the accumulation of retransmission accumulator 40, then note that the value $H^H H$ actually corresponds to that product as determined for either a first transmission or one of the I retransmissions; hence, consistent with the above, the "(i)" subscript is added to the product, thereby yielding an indication of $H^H_{(i)} H_{(i)}$. Accordingly, for a given first transmission or a retransmission of that first transmission, let this product be referred to in this document as the channel product matrix and be as shown in the following Equation 6:

$$C_{(i)} = H^H_{(i)} H_{(i)} \qquad \text{Equation 6}$$

Note that the term "channel product matrix" is used in the sense that the product of Equation 6 represents generally what may be removed from the output of matched filter 38 so as to recover the symbols, s, therein. Specifically, the signal output from matched filter 38 represents the received vector r multiplied times $H^H$ (i.e., as $H^H r$), and ignoring noise, and since r as shown in Equation 3 includes the term Hs, then the signal output from matched filter 38 also represents $H^H H S$. Thus, to recover s and for now also ignoring the effect of interference, then the product $H^H H$ may be multiplied times the output $H^H H s$ of matched filter 38 in an effort to recover s.

The output of adder $42_1$ passes through a delay block $42_2$ to a buffer $42_3$, and note that delay block $42_2$ is included to suggest that there is anticipated some delay in the operation of accumulator 42 as it awaits receipt of the channel estimates and products corresponding to subsequent retransmissions from transmitter 12 or 12'. The output of buffer $42_3$ is connected as an addend input to adder $42_1$. Looking then at the operation of accumulator 42, it operates in a comparable manner to accumulator 40, but with respect to accumulating each value $C_{(i)}$ corresponding to the I+1 retransmissions (and receipt by receiver $30_1$) of a same packet. For a first retransmission of (i)=1, then $C_{(1)}$ is summed by adder $42_1$ with the value of $H^H H$ that corresponded to the first transmission, where that earlier value of $H^H H$ was previously stored in buffer $42_3$. That sum again incurs a delay $42_2$ and is stored in buffer $42_3$, thereby overwriting the previous sum stored therein. From the preceding, one skilled in the art will appreciate that this process may repeat for numerous retransmissions, whereby ultimately the final $C_{(I+1)}$ value is added by adder $42_1$ to the accumulation corresponding to the previous I retransmissions and the first transmission, thereby presenting a resulting output indicated herein and in FIG. 3 as $C_I$, and that value of $C_I$ is connected to interference suppression block 44.

Interference suppression block 44 includes sufficient circuitry to reduce the effects of interference that are included within the received signal, where as shown above the input signal $\tilde{y}_I$ represents the accumulation of I+1 transmissions of a same packet due to a detected error (e.g., CRC) in that packet. In general, FIG. 3 illustrates this functionality as a function F[.]. This designation is intended to depict that, as known in the art, interference reduction or suppression may be achieved using numerous different functions or approaches, as discussed below. However, before discussing those approaches, note the preferred embodiment contrasts with the prior art. For example, prior art HARQ systems do not include interference suppression because those systems have not been implemented with interference-limited techniques (e.g., CDMA, TDMA, MIMO). Further, therefore, the prior art use of interference suppression has not been in connection with HARQ and when used has related to a single transmission of a signal and some channel effect parameter corresponding to that single transmission of a signal. In contrast, as shown above, interference suppression block 44 receives and operates with respect to an accumulated signal $\tilde{y}_i$ and an accumulated channel product matrix, $C_i$. Thus the functionality of interference suppression block 44 in determining the cumulative soft decision statistics after N transmissions may be stated generally as in the following Equation 6.1, where N is also used added to scale each accumulated value:

$$F[\tilde{y}_i, C_i] = F\left[\frac{1}{N}\sum_{i=1}^{N} y_{(i)}, \frac{1}{N}\sum_{i=1}^{N} C_{(i)}\right] \quad \text{Equation 6.1}$$

Note that the actual value of the accumulated value of $C_I$ also may be scaled, such as by multiplying it times 1/I+1, where recall that the denominator of that fraction is the total number of transmissions including the first and all I retransmissions of a given packet. Further, by using this factor, note that the effects of different scenarios are comprehended. In other words, the channel matrix $H_{(i)}$ can be the same or different for the first transmission and every retransmission and, hence, the same is true for each value $C_{(i)}$. For example, in fast fading scenarios, $H_{(i)}$ is uncorrelated with $H_{(I+1)}$. This results in what may be analogized to an effective time diversity gain upon retransmissions. For slow fading of quasi-static channels, $H_{(i)}=H$, and for these instances there are techniques that can be used to induce "artificial" fast fading, such as described in U.S. patent application Ser. No. 10/230,003, filed Aug. 28, 2002, and herein incorporated herein by reference.

Completing the discussion of interference suppression block 44, it may implement one of many known approaches to suppressing interference, where those approaches are modified in that the accumulated channel product matrix $C_I$ is used by block 44. Such approaches for block 44 include: (i) zero forcing or minimum mean square error ("MMSE"); (ii) 1-shot (i.e., linear) or iterative; (ii) 1-stage or multistage; and (iv) maximum likelihood detection. Certain of these techniques also may be combined, as is known, such as with a linear MMSE, an iterative MMSE, a linear zero forcing, and an iterative zero forcing. Although an iterative receiver may tend to outperform linear receivers due to the reduced noise enhancement and higher diversity gain, the iterative approach may suffer from error propagation especially for low signal-to-noise ratio. Preferably, however, this can be reduced considerably by ordering the detection, where the largest signal-to-interference plus noise ratio is detected at each iteration. Further, each of the preceding approaches may be implemented in various manners. For example, a linear equalizer can be implemented using multiple-input multiple-output FIR filtering. As another example, a linear approach can be implemented using a series of multiple-input multiple-output FIR filtering operations. As still another example, equalizer taps also can be trained using adaptive filtering techniques, as may be ascertained by one skilled in the art. In any event, the output of interference suppression block 44 represents a soft estimate of the symbol vector s, and this estimate is referred to herein and shown in FIG. 3 as $\tilde{z}_I$. Accordingly, the relationship of the input and output to interference suppression block 44 may be stated according to the following Equation 7:

$$\tilde{z}_I = F[\tilde{y}_i, C_i] \quad \text{Equation 7}$$

The function F[.] in Equations 6.1 and 7 may be further illustrated by ways of example, as are now shown for the two alternatives wherein interference suppression block 44 is implemented using a linear zero forcing function or where interference suppression block 44 is implemented using linear MMSE. In the case of interference suppression block 44 as linear zero forcing function, then Equation 6.1 may be written as the following Equation 7.1:

$$F[\tilde{y}_i, C_i] = C_i^{-1}\tilde{y}_i \quad \text{Equation 7.1}$$

For linear zero forcing, therefore, Equation 7.1 may be expanded such that the soft symbol decision can be written as in the following Equation 7.2, where as in Equation 6.1 N is the number of transmissions and is used as a factor to scale each accumulated value:

$$F[\tilde{y}_i, C_i] = C_i^{-1}\tilde{y}_i \Rightarrow \left(\frac{1}{N}\sum_{i=1}^{N} C_{(i)}\right)^{-1}\left(\frac{1}{N}\sum_{i=1}^{N} y_{(i)}\right) = \left(\sum_{i=1}^{N} C_{(i)}\right)^{-1}\sum_{i=1}^{N} y_{(i)} \quad \text{Equation 7.2}$$

In the case of interference suppression block 44 as linear MMSE function, then Equation 6.1 may be written as the following Equation 7.3:

$$F[\tilde{y}_i, C_i] = (C_I + \mu \Lambda^{-1})^{-1} \tilde{y}_I \qquad \text{Equation 7.3}$$

In Equation 7.3, $\mu > 0$ is the appropriate noise variance, while $\Lambda$ is a matrix having diagonals equal to signal powers $\{\lambda_1, \lambda_2, \ldots, \lambda_P\}$, for the P transmit antennas given an assumption of symbol independence and an expected value of $E[ss^H] = \{\lambda_1, \lambda_2, \ldots, \lambda_P\}$. From Equation 7.3, note that the specific example of linear MMSE both further involves the terms $$\mu = \frac{\sigma^2}{N} > 0$$

and $\Lambda$ and, thus, FIG. 3 further illustrates these terms as possible inputs to interference suppression block 44, using a dotted line to demonstrate that such inputs are used for the present example. Thus, interference suppression block 44 not only operates with respect to an accumulated signal $\tilde{y}_I$ and an accumulated channel product matrix, $C_I$, it is further responsive to these additional inputs for this example. Concluding linear MMSE, Equation 7.3 may be expanded such that the soft symbol decision can be written as in the following Equation 7.4, where again a factor relating to the N transmissions is also added to scale each accumulated value:

$$F[\tilde{y}_i, C_i] \Rightarrow \left( \frac{1}{N} \sum_{i=1}^{N} C_{(i)} + \frac{\sigma^2}{N} \Lambda^{-1} \right)^{-1} \left( \frac{1}{N} \sum_{i=1}^{N} y_{(i)} \right) = \qquad \text{Equation 7.4}$$

$$\left( \sum_{i=1}^{N} C_{(i)} + \sigma^2 \Lambda^{-1} \right)^{-1} \left( \sum_{i=1}^{N} y_{(i)} \right)$$

Lastly, one skilled in the art may derive the implementations for the other alternatives set forth above for interference suppression block 44.

The soft estimates $\tilde{z}_I$ are connected to the remaining circuitry in receiver 30₁, which may be constructed and operate according to known principles. Thus, $\tilde{z}_I$ is connected to a demodulator 46, which removes the modulation imposed on the signal by symbol mapper 18 of transmitter 12 or 12' and thereby outputs encoded bit probabilities, which are generally equivalent to soft encoded bit estimates. The output of demodulator 46 is connected to a deinterleaver 48, which performs an inverse of the function of interleaver 16 of transmitter 12 or 12', and the output of deinterleaver 48 is connected to a channel decoder 50. Channel decoder 50 may include a Viterbi decoder, a turbo decoder, a block decoder (e.g., Reed-Solomon decoding), or still other appropriate decoding schemes as known in the art. In any event, channel decoder 50 further decodes the data received at its input, typically operating with respect to certain error correcting codes, and it outputs a resulting stream of estimated decoded bits. Indeed, note that the probability of error for data input to channel decoder 50 is far greater than that after processing and output by channel decoder 50.

The decoded symbols are output from channel decoder 50 to a packet error check block 52 which, as discussed earlier, in one preferred embodiment is a CRC error check block. Block 52 performs as known in the art, that is, it examines the CRC code as corresponding to a packet of bits, where that packet includes numerous symbols. If the CRC code indicates an error in the packet, then block 52 transmits a signal, via a wireless feedback channel illustrated by a dotted line, to transmitter 12 or 12'. As discussed above, in response to this communication, transmitter 12 or 12' will retransmit the packet and, hence, its corresponding symbols, and that retransmission will be processed as described above. Such retransmission requests will continue until either no CRC error is found or until some maximum threshold number of retransmissions have been requested. Once all retransmissions are complete, then a corresponding set of decoded symbols are provided by channel decoder 50 and then passed to block 52. Finally, the decoded symbol stream output by block 52 may be received and processed by additional circuitry in receiver 30₁, although such circuitry is not shown in FIG. 3 so as to simplify the present illustration and discussion.

Figure 4:
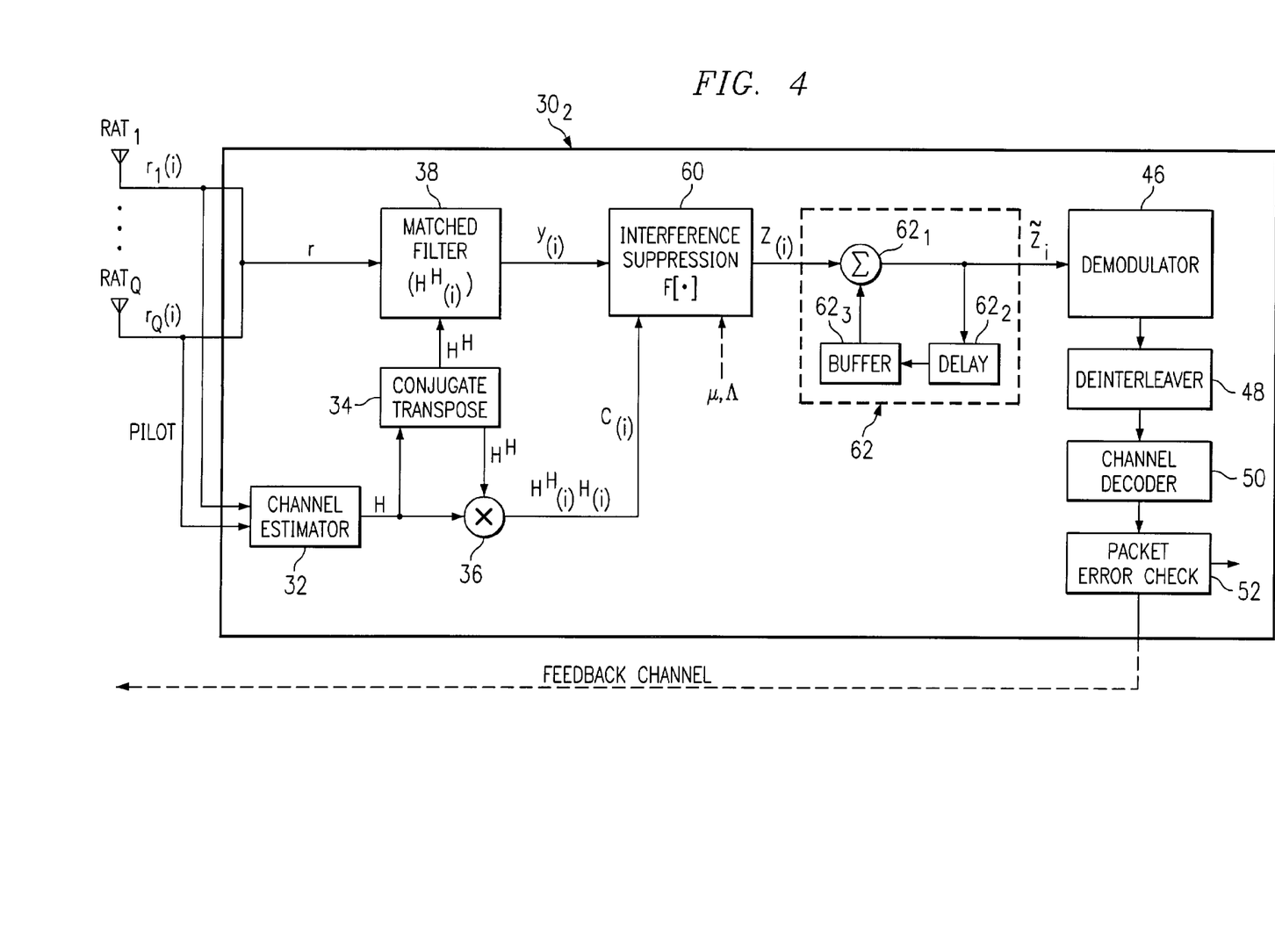
FIG. 4 illustrates an electrical and functional block diagram of a receiver $30_2$ according to the preferred embodiment and for receiving signals from either of transmitter 12 of FIG. 2a or transmitter 12' of FIG. 2b.

FIG. 4 illustrates an electrical and functional block diagram of a receiver 30₂ as an alternative preferred embodiment for receiving signals from transmitter 12 of FIG. 2a or transmitter 12' of FIG. 2b. Receiver 30₂ includes certain of the same features as receiver 30₁ described above with respect to FIG. 3 and for those features like reference numbers are used in both FIGS. 3 and 4. Additionally, since these features are detailed above, the reader is assumed familiar with those details and they are not repeated at the same level of detail in the following discussion of receiver 30₂. Generally, therefore, receiver 30₂ includes a number Q of receive antennas RAT₁ through RAT_Q, and the signals $r_{(i)}$ from those antennas are connected via a radio frequency interface (not shown) to a channel estimator 32 and a matched filter 38. Channel estimator 32 provides its channel estimate, H, as an input to a conjugate transpose determination block 34 and as a multiplicand input to multiplier 36. Conjugate transpose determination block 34 determines the conjugate transpose of its matrix input, H, and the resultant output, $H^H$, is connected as a multiplicand input to multiplier 36 and also to matched filter 38. Multiplier 36 determines the product of its two multiplicand inputs and, thus, it outputs the value of $H^H H$, where recall from Equation 6 that this product is designated as $C_{(i)}$. Additional connections and functionality, and particularly as directed to differences between receivers 30₂ and 30₁, are described below.

Matched filter 38 of receiver 30₂ provides an output $y_{(i)}$ as described with respect to receiver 30₁, but in the case of receiver 30₂ the value $y_{(i)}$ is connected as an input to an interference suppression block 60. Interference suppression block 60 also receives the value $C_{(i)}$ from multiplier 36.

Interference suppression block 60 includes sufficient circuitry to reduce the effects of interference that are included within the received signal, and in general FIG. 4 illustrates this functionality as a function F[.] to depict that, like block 44 in FIG. 3, again interference reduction or suppression may be achieved using numerous different approaches, as discussed above (e.g., (i) zero forcing or MMSE; (ii) 1-shot (i.e., linear) or iterative; (iii) 1-stage or multistage; (iv) maximum likelihood detection; (v) combination of approaches (i) through (iv)). For receiver 30₂, as was the case also for receiver 30₁, this alternative preferred embodiment also contrasts with the prior art in that prior art HARQ systems do not include interference suppression because those systems have not been implemented with interference-limited techniques (e.g., CDMA, TDMA, MIMO). The operation of interference suppression block 60 is generally as suggested by its name, that is, to operate with respect to its inputs to suppress the effects of interference in the received input signal $y_{(i)}$, where the specific operation is based on the type of interference suppression approach. In all approaches, however, note that the suppression for receiver $30_2$ is performed individually for each of the original transmission of a packet as well as for each of the I retransmissions of that packet; mathematically, this aspect is illustrated in that interference suppression block 60 operates with respect to each pair of signals $y_{(i)}$ and $C_{(i)}$, for a given transmission or retransmission of a same packet. Thus, this is in contrast to the alternative preferred embodiment receiver $30_1$ of FIG. 3, which performs its interference suppression only after each signal from the matched filter is separately accumulated, as is each channel product matrix signal from multiplier 36. Thus the functionality of interference suppression block 60 in determining the cumulative soft decision statistics after N transmissions may be stated generally as in the following Equation 7.5, where again the factor N is added to scale each accumulated value:

$$\frac{1}{N}\sum_{i=1}^{N} F[y_{(i)}, C_{(i)}] \qquad \text{Equation 7.5}$$

In addition, the post-processing following interference suppression block 60 differs from the prior art as well as from receiver $30_1$, as further described below. Returning to receiver $30_2$ of FIG. 4, each output corresponding to a received and processed retransmission is designated $z_{(i)}$, where i is one of the I retransmissions. This output signal, $z_{(i)}$, is connected to a retransmission accumulator 62.

Before discussing retransmission accumulator 62, note that the function F[.] for interference suppression block 60 may be illustrated also by ways of example using the same two alternatives that were described earlier with respect to interference suppression block 44, namely, using a linear zero forcing function or using linear MMSE, but here note that each received set of inputs to interference suppression block 60 corresponds only to the $I^{th}$ re-transmission. In the case of interference suppression block 60 as linear zero forcing function, then the terms of Equation 7.5 may be expressed as shown in the following Equation 7.6 for the linear zero forcing function:

$$\frac{1}{N}\sum_{i=1}^{N} F[y_{(i)}, C_{(i)}] \Rightarrow \frac{1}{N}\sum_{i=1}^{N} C_{(i)}^{-1} y_{(i)} \qquad \text{Equation 7.6}$$

In the case of interference suppression block 60 as linear MMSE function, then Equation 7.5 may be written as the following Equation 7.7:

$$F[y_{(i)}, C_{(i)}] = (C_{(i)} + \mu\Lambda^{-1})^{-1} y_{(i)} \qquad \text{Equation 7.7}$$

Concluding linear MMSE, Equation 7.7 may be expanded such that the soft symbol decision can be written as in the following Equation 7.8, where again a factor relating to the N transmissions is also added to scale each accumulated value:

$$\frac{1}{N}\sum_{i=1}^{N} F[y_{(i)}, C_{(i)}] \Rightarrow \frac{1}{N}\sum_{i=1}^{N} (C_{(i)} + \sigma^2\Lambda^{-1})^{-1} y_{(i)} \qquad \text{Equation 7.8}$$

From Equation 7.8, note that the specific example of linear MMSE further involves the terms $\mu=\sigma^2>0$ and $\Lambda$ and, thus, FIG. 4 further illustrates these terms as possible inputs to interference suppression block 60, using a dotted line to demonstrate that such inputs are used for the present example.

Retransmission accumulator 62 receives the signal, $z_{(i)}$, and it is connected as an addend input to an adder $62_1$. The output of adder $62_1$ passes through a delay block $62_2$ to a buffer $62_3$. Delay block $62_2$ is included to suggest that there is anticipated some delay in the operation of accumulator 62 as it, as part of receiver $30_2$, awaits receipt of subsequent retransmissions from transmitter 12 or 12'. The output of buffer $62_3$ is connected as an addend input to adder $62_1$. Looking then at the general operation of retransmission accumulator 62, first recall that for all of the I+1 transmissions, interference suppression block 60 suppresses interference in the re-transmittal signal, with the result, $z_{(i)}$, provided to retransmission accumulator 62. Accordingly, retransmission accumulator 62 accumulates the suppression achieved for each of the I+1 transmissions, where this operation provides a result $\tilde{z}_I$ that may therefore be stated as shown in the following Equation 8:

$$\tilde{z}_i = \sum_{i=1}^{I+1} z_{(i)} = \sum_{i=1}^{I+1} F[y_{(i)}] \qquad \text{Equation 8}$$

From Equation 8, and recalling that the value $F[y_{(i)}]$ includes, for each of the I+1 transmissions, the value $C_{(i)}$, then each value $z_{(i)}$ reflects an accumulation of each value $C_{(i)}$ insofar as it is included in $F[y_{(i)}]$. Thus, each accumulated value of $z_{(i)}$ also may be scaled, such as by multiplying it times 1/I+1. In any event, the output $\tilde{z}_{(i)}$ of retransmission accumulator 62 represents a soft estimate of the symbol vector s. The soft estimate $\tilde{z}_I$ is connected to the remaining circuitry in receiver $30_2$, which may be constructed and operate according to known principles.

Figure 5:
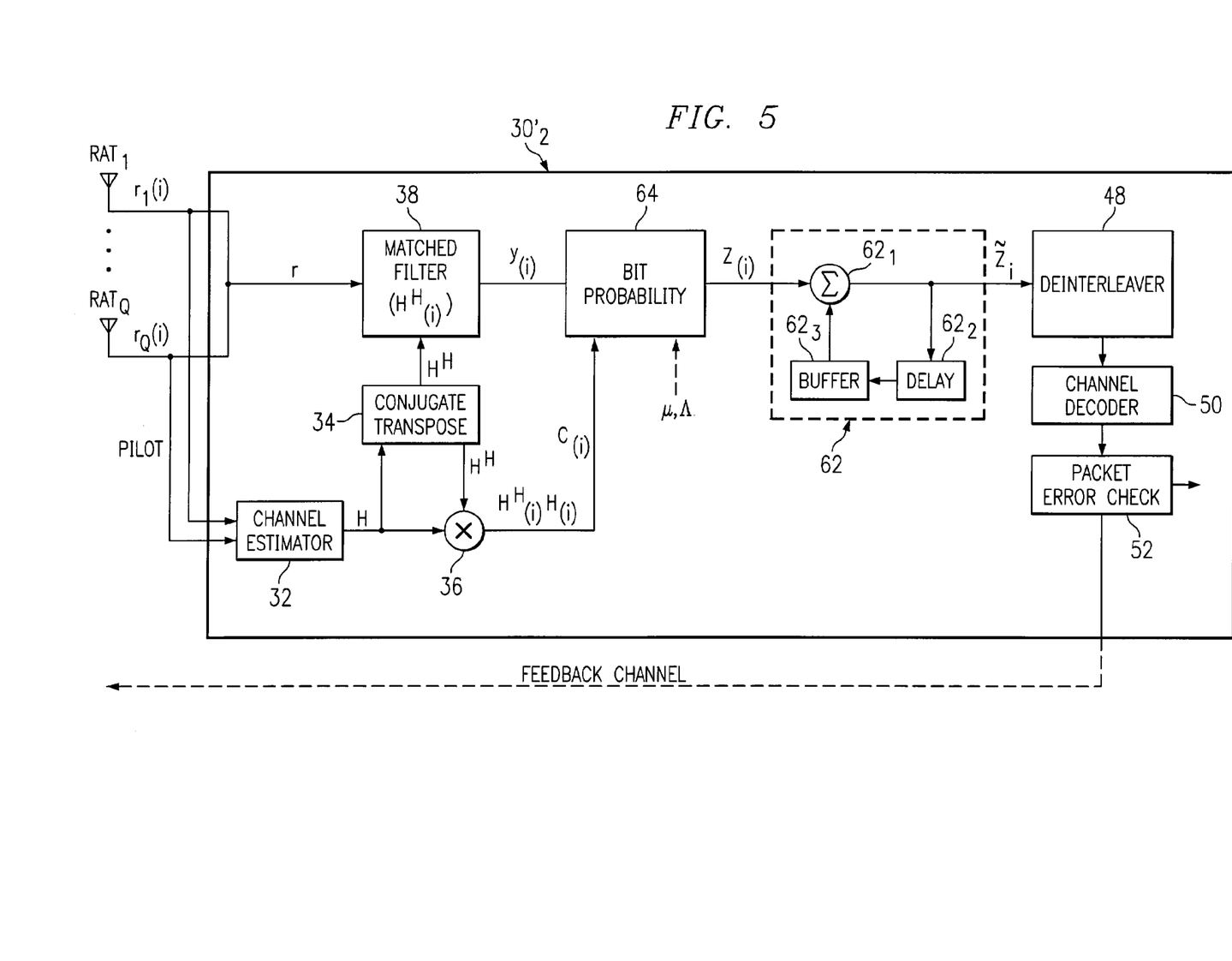
FIG. 5 illustrates a receiver $30_2$' as yet another alternative preferred embodiment for receiving signals from transmitter 12 of FIG. 2a or transmitter 12' of FIG. 2b.

FIG. 5 illustrates a receiver $30_2'$ as yet another alternative preferred embodiment for receiving signals from transmitter 12 of FIG. 2a or transmitter 12' of FIG. 2b. Receiver $30_2'$ of FIG. 5 shares many of the same blocks as receiver $30_2$ of FIG. 4 and, thus, like reference numbers are carried forward for such blocks from FIG. 4 to FIG. 5 and the reader is assumed familiar with those blocks so the previous discussion regarding them is not repeated below. By way of contrast, however, receiver $30_2'$ illustrates the example mentioned above wherein the interference suppression technique employed is maximum likelihood. As known in the art, the maximum likelihood technique effectively combines the operations of interference suppression and demodulation in order to directly produce bit probabilities; in this regard, note therefore that receiver $30_2'$ includes a bit probability block 64 in place of an individual interference suppression block, and the bit probability block 64 therefore operates jointly as opposed to the preceding examples where symbol probabilities are first determined followed by demodulation. Also in this regard, therefore, the later stage of demodulation 46 from previous embodiments is not separately shown in FIG. 5, as that function is encompassed within bit probability block 64. In other words, therefore, bit probability block 64 comprises both an interference suppression and demodulation function. The remaining operation of receiver $30_2'$ will therefore be readily ascertainable by one skilled in the art. Further, this illustration of an implementation of interference suppression as part of the bit probability function also may be readily applied to receiver $30_1$ of FIG. 3.

From the above, it may be appreciated that the above embodiments provide an interference-limited wireless communication system with packet retransmission in response to detected packet error, where signals from the retransmitted packets are accumulated so as to improve symbol soft estimates. Two preferred receivers $30_1$ and $30_2$ are described, where generally it may be observed that receiver $30_1$ accumulates each received signal and a corresponding channel product matrix and then performs interference suppression on the accumulated totals, while receiver $30_2$ performs interference suppression with respect to each individual signal corresponding to a retransmission along with a corresponding channel product matrix and then accumulates the total of each interference suppression. Selection of each different receiver may be based on various design criteria, including whether the expected channel is fast fading or quasi-static. Further, the two different receivers $30_1$ and $30_2$ will have different buffering requirements, which also may impact a selection as between the two. More particularly, while both receivers store data for each of the I+1 transmissions of a packet, a higher number of A/D bits may be required for storing the input to interference suppression block 44 of receiver $30_1$ as compared to the buffering of the accumulations for retransmission accumulator 62, because the former is likely to require a greater data resolution in order to compute considerable matrix operations and achieve fixed point resolution, thereby necessitating a greater number of input bits. In any event, each approach provides various benefits over the prior art. Further, while the present embodiments have been described in detail, various substitutions, modifications or alterations could be made to the descriptions set forth above without departing from the inventive scope which is defined by the following claims.

The invention claimed is:

1. A wireless receiver for receiving signals from a transmitter comprising at least one transmit antenna in a wireless system, wherein the signals comprise a plurality of symbols and wherein each symbol in the plurality of symbols corresponds to a number of bits, the receiver comprising:
   a plurality of receive antennas;
   collection circuitry, coupled to the plurality of receive antennas, for collecting a plurality of signal samples from the plurality of receive antennas, wherein the plurality of signal samples comprise at least one symbol and interference effects and correspond to each packet in a number I+1 of packets transmitted by the transmitter, wherein each packet of the number I+1 of packets as transmitted by the transmitter comprise at least a portion of a same set of symbols and are re-transmitted by the transmitter in response to a request from the receiver;
   suppression circuitry, coupled to the collection circuitry, for suppressing the interference effects in the number I+1 of packets;
   circuitry for accumulating a result corresponding to each packet of the number I+1 of packets, wherein the result corresponds to an output of the collection circuitry, and for the accumulating either prior to or after the operation of said suppression circuitry;
   circuitry responsive to signals from the suppression circuitry and for providing estimates of a group of bits;
   detection circuitry for detecting an error in a packet that comprises the group of bits;
   circuitry for sending the request to the transmitter to transmit a retransmission of a packet in response to the detection circuitry detecting the error; and
   circuitry, coupled to the plurality of receive antennas, for determining a channel estimate matrix; and
   wherein the circuitry for accumulating is coupled between the collection circuitry and the suppression circuitry; and
   wherein the suppression circuitry is responsive to the accumulated results corresponding to each packet of the number I+1 of packets.

2. The receiver of claim 1 and further comprising circuitry, coupled to the plurality of receive antennas, for determining a channel estimate matrix.

3. The receiver of claim 2:
   wherein the plurality of symbols comprises pilot symbols; and
   wherein the circuitry for determining a channel estimate matrix determines the channel estimate matrix in response to the pilot symbols.

4. The receiver of claim 2 and further comprising circuitry for increasing the signal to noise ratio of the received signals in response to the channel estimate matrix.

5. The receiver of claim 2 and further comprising circuitry for increasing the signal to noise ratio of the received signals in response to a conjugate transpose of the channel estimate matrix.

6. The receiver of claim 2:
   and further comprising circuitry for determining a plurality of channel estimate matrices; and
   wherein each channel estimate matrix in the plurality of channel estimate matrices corresponds to a respective packet in the number I+1 of packets transmitted by the transmitter.

7. The receiver of claim 6 wherein the circuitry for determining a plurality of channel estimate matrices produces a result corresponding to each packet of the number I+1 of packets by multiplying the received signals corresponding to each packet of the number I+1 of packets times a respective conjugate transpose of the channel estimate matrix corresponding to each packet of the number I+1 of packets.

8. The receiver of claim 7 and further comprising circuitry for determining a product corresponding to each packet of the number I+1 of packets by multiplying a conjugate transpose of the channel estimate matrix corresponding to each packet of the I+1 packets times a respective channel estimate matrix corresponding to each packet of the number I+1 of packets.

9. The receiver of claim 8 and further comprising circuitry for accumulating the product corresponding to each packet of the number I+1 of packets.

10. The receiver of claim 9 wherein the suppression circuitry is further responsive to the accumulated products.

11. The receiver of claim 9 wherein the suppression circuitry is selected from a group consisting of zero forcing, minimum mean square error, iterative, and maximum likelihood detection.

12. The receiver of claim 9:
    wherein the suppression circuitry comprises maximum likelihood detection circuitry; and further comprising circuitry for determining encoded bit probabilities from which the estimates of a group of bits are determined.

13. The receiver of claim 9:
wherein the suppression circuitry provides a corresponding output signal responsive to the accumulated products and the accumulated results; and
wherein the circuitry for requesting is responsive to the output signal.

14. The receiver of claim 6 wherein the suppression circuitry suppresses the interference effects in each individual one of each result corresponding to each packet of the number I+1 of packets.

15. The receiver of claim 14:
and further comprising circuitry for determining a product corresponding to each packet of the number I+1 of packets by multiplying a conjugate transpose of the channel estimate matrix corresponding to each packet of the I+1 packets times a respective channel estimate matrix corresponding to each packet of the number I+1 of packets; and
wherein the suppression circuitry suppresses the interference effects in each individual one of each result corresponding to each packet of the number I+1 of packets in response to the product corresponding to each packet of the number I+1 of packets.

16. The receiver of claim 15 wherein the suppression circuitry is selected from a group consisting of zero forcing, minimum mean square error, iterative, and maximum likelihood detection.

17. The receiver of claim 15:
wherein the suppression circuitry comprises maximum likelihood detection circuitry; and
further comprising circuitry for determining encoded bit probabilities from which the estimates of a group of bits are determined.

18. The receiver of claim 1 wherein the signals from the transmitter comprise a code division multiple access format.

19. The receiver of claim 1 wherein the signals from the transmitter comprise a multiple-input multiple-output format.

20. The receiver of claim 1 wherein the signals from the transmitter comprise a time division multiple access format.

21. The receiver of claim 1 and further comprising circuitry for receiving signals from the suppression circuitry and for providing estimates of the symbols.

22. The receiver of claim 1 in combination with the transmitter.

23. A method of operating a wireless receiver to receive signals from a transmitter comprising at least one transmit antenna in a wireless system, wherein the signals comprise a plurality of symbols and wherein each symbol in the plurality of symbols corresponds to a number of bits, the method comprising:
collecting a plurality of signal samples from a plurality of receive antennas, wherein the plurality of signal samples comprise at least one symbol and interference effects and correspond to each packet in a number I+1 of packets transmitted by the transmitter, wherein each packet of the number I+1 of packets as transmitted by the transmitter comprise at least a portion of a same set of symbols and are re-transmitted by the transmitter in response to a request from the receiver;
suppressing the interference effects in the number I+1 of packets;
accumulating a result corresponding to each packet of the number I+1 of packets, wherein the result corresponds to an output from the collecting step, and wherein the accumulating step occurs either prior to or after the suppressing step with respect to the number I+1 of packets;
responsive to signals following the step of suppressing the interference effects, providing estimates of a group of bits;
detecting whether there is an error in a packet that comprises the group of bits; and
in response detecting the error, requesting the transmitter to transmit a retransmission of a packet; and
wherein the accumulating step is done between the collection and suppression steps; and
wherein the suppressing step is further responsive to the accumulated products.

24. The method of claim 23 and further comprising determining a channel estimate matrix in response to signals received from at least one receive antenna.

25. The method of claim 24 and further comprising increasing the signal to noise ratio of the received signals in response to a conjugate transpose of the channel estimate matrix.

26. The method of claim 24:
and further comprising determining a plurality of channel estimate matrices; and
wherein each channel estimate matrix in the plurality of channel estimate matrices corresponds to a respective packet in the number I+1 of packets transmitted by the transmitter.

27. The method of claim 26 wherein the determining step produces a result corresponding to each packet of the number I+1 of packets by multiplying the received signals corresponding to each packet of the number I+1 of packets times a respective conjugate transpose of the channel estimate matrix corresponding to each packet of the number I+1 of packets.

28. The method of claim 26 and further comprising determining a product corresponding to each packet of the number I+1 of packets by multiplying a conjugate transpose of the channel estimate matrix corresponding to each packet of the I+1 packets times a respective channel estimate matrix corresponding to each packet of the number I+1 of packets.

29. The method of claim 28 and further comprising accumulating the product corresponding to each packet of the number I+1 of packets.

30. The method of claim 26 wherein the suppressing step suppresses the interference effects in each individual one of each result corresponding to each packet of the number I+1 of packets.

31. The method of claim 30:
and further comprising determining a product corresponding to each packet of the number I+1 of packets by multiplying a conjugate transpose of the channel estimate matrix corresponding to each packet of the I+1 packets times a respective channel estimate matrix corresponding to each packet of the number I+1 of packets; and
wherein the suppressing step suppresses the interference effects in each individual one of each result corresponding to each packet of the number I+1 of packets in response to the product corresponding to each packet of the number I+1 of packets.

32. The receiver of claim 1 wherein the circuitry for sending the request is further for sending to the transmitter an acknowledgement when a packet is successfully detected.

* * * * *